UNITED STATES PATENT OFFICE.

RAPHAEL H. WOLFF, OF NEW YORK, N. Y.

TRANSFERRING DEPHOSPHORIZED MOLTEN STEEL.

946,302.  Specification of Letters Patent.  Patented Jan. 11, 1910.

No Drawing.  Application filed April 21, 1909.  Serial No. 491,312.

*To all whom it may concern:*

Be it known that I, RAPHAEL H. WOLFF, a citizen of the United States, residing at New York, in the county of New York and State of New York, have invented new and useful Improvements in Transferring Dephosphorized Molten Steel, of which the following is a specification.

To desulfurize and deoxidize basic metal from a basic converter or open hearth furnace (said metal having been already dephosphorized in the furnace,) for the purpose of transferring this metal to an electric furnace for the purpose of finishing the same and to allow the oxid gases and slag remaining in the steel to rise to the top, I proceed in the following prompt and economical way to attain my end in the shortest time with the least expense. I take the dephosphorized molten steel from the basic converter or open hearth furnace and pour same in a ladle but before doing so I charge a basic desulfurizing and deoxidizing slag in the molten state, in the bottom of the ladle. The slag to be fused with the molten dephosphorized metal in the ladle, for the purpose stated may consist of lime, fluor-spar, manganese ore, ferrosilicon, ferromanganese, calcium carbid, silicid of calcium, aluminum or any other desulfurizing or deoxidizing agents well known in the art. Any of the foregoing in such a way or combination that will eliminate sulfur and remove oxygen can be employed. This slag being at a high heat, coming in contact with the molten dephosphorized metal will precipitate or hasten the operation of desulfurization and deoxidation, which will enable me to carry the metal sufficiently long in the ladle to thoroughly desulfurize and deoxidize the same, and allow me sufficient time to charge the already purified metal in any kind of electric furnace for the purpose of finishing and resting the metal. By doing this any kind of electric furnace will be suitable that will allow a resting of the metal at the least expense, so that any gas or slag left in the metal may rise to the top and the steel can be finished and be of a superior grade, comparatively cheaper by saving power and time in the electric furnace.

I produce molten highly basic desulfurizing and deoxidizing slag at a very high heat in electric or any other suitable furnace. I choose an electric arc furnace, which will enable me to melt a very highly basic slag, suitable for my purpose.

I claim:—

The charging of a dephosphorized molten steel from a basic converter or open hearth furnace on top of a basic slag, for the purpose of desulfurizing and deoxidizing the metal thoroughly and rapidly and then recharging this metal promptly in an electric furnace for the purpose stated.

In testimony whereof I have hereunto set my hand in the presence of two subscribing witnesses.

RAPHAEL H. WOLFF.

Witnesses:
WM. E. WARLAND,
CHRISTIAN OLMSTAEDT.